(12) United States Patent
Palmer et al.

(10) Patent No.: US 9,558,444 B2
(45) Date of Patent: *Jan. 31, 2017

(54) NEURAL PROCESSING UNIT

(71) Applicant: The Regents of the University of California, La Jolla, CA (US)

(72) Inventors: Douglas A. Palmer, San Diego, CA (US); Michael Florea, Lake Forest, CA (US)

(73) Assignee: The Regents Of The University Of California, Oakland, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 14/145,711

(22) Filed: Dec. 31, 2013

(65) Prior Publication Data

US 2014/0172763 A1    Jun. 19, 2014

Related U.S. Application Data

(63) Continuation of application No. 13/011,727, filed on Jan. 21, 2011, now Pat. No. 8,655,815.

(Continued)

(51) Int. Cl.
*G06N 3/06* (2006.01)
*G06N 3/063* (2006.01)

(52) U.S. Cl.
CPC ............... *G06N 3/06* (2013.01); *G06N 3/063* (2013.01)

(58) Field of Classification Search
CPC .................. G06N 3/06; G06N 3/063

(Continued)

(56) References Cited

U.S. PATENT DOCUMENTS 4,974,169 A    11/1990 Engel
5,285,524 A    2/1994 Cok
(Continued)

FOREIGN PATENT DOCUMENTS

EP    0636001 A1    2/1995
JP    H03-042768    2/1991
(Continued)

OTHER PUBLICATIONS

Efficient Modeling of Spiking Neural networks on a Scalable Chip Multiprocessor, by Xin Jln, published 2008.*

(Continued)

*Primary Examiner* — Stanley K Hill
*Assistant Examiner* — Thomas Fink
(74) *Attorney, Agent, or Firm* — Mintz Levin Cohn Ferris Glovsky and Popeo, P.C.

(57) ABSTRACT

The subject matter disclosed herein provides methods, apparatus, and articles of manufacture for neural-based processing. In one aspect, there is provided a method. The method may include reading, from a first memory, context information stored based on at least one connection value; reading, from a second memory, an activation value matching the at least one connection value; sending, by a first processor, the context information and the activation value to at least one of a plurality of microengines to configure the at least one microengine as a neuron; and generating, at the at least one microengine, a value representative of an output of the neuron. Related apparatus, systems, methods, and articles are also described.

17 Claims, 10 Drawing Sheets

Related U.S. Application Data

(60) Provisional application No. 61/346,441, filed on May 19, 2010.

(58) Field of Classification Search
USPC .................................................. 706/26
See application file for complete search history.

(56) References Cited

U.S. PATENT DOCUMENTS

| | | | |
|---|---|---|---|
| 5,325,464 | A | 6/1994 | Pechanek et al. |
| 5,701,394 | A | 12/1997 | Arita et al. |
| 6,859,855 | B1 | 2/2005 | Shimizu |
| 8,126,828 | B2 | 2/2012 | Snook et al. |
| 2006/0010144 | A1 | 1/2006 | Lawrence et al. |
| 2007/0011118 | A1* | 1/2007 | Snook .................. G06F 15/7867 706/16 |
| 2008/0120260 | A1* | 5/2008 | Yancey .................. G06N 3/063 706/33 |
| 2008/0215514 | A1 | 9/2008 | Morgan |
| 2010/0095088 | A1 | 4/2010 | Vorbach |
| 2010/0161533 | A1 | 6/2010 | Snook et al. |
| 2010/0312735 | A1 | 12/2010 | Knoblauch |
| 2011/0219035 | A1 | 9/2011 | Korsunsky et al. |
| 2011/0313961 | A1 | 12/2011 | Toscano et al. |
| 2012/0240185 | A1 | 9/2012 | Kapoor et al. |

FOREIGN PATENT DOCUMENTS

| | | | |
|---|---|---|---|
| JP | H04-182769 | A | 6/1992 |
| JP | 2008-310524 | A | 12/2008 |
| JP | 2009508182 | A | 2/2009 |
| WO | WO-92-02866 | A1 | 2/1992 |
| WO | WO-93-20552 | A1 | 10/1993 |

OTHER PUBLICATIONS

An Accelerator for Neural Networks with Pulse-Coded Model Neurons, by Frank, published 1999.*
Purnaprajna, et al., "Using Run-time Reconfiguration for Energy Savings in Parallel Data Processing", Proceedings of the International Conference on Engineering of Reconfigurable Systems and Algorithms, Jul. 13, 2009.
Itsurou Oda, "Linux Kernel 2.6 Decoding Room, the tenth, Management of Process space," UNIX User, Softbank publishing, Co. Ltd., Mar. 1, 2005, vol. 14, No. 3, pp. 117-132.
Eichner, et al., "Neural Simulations on Multi-Core Architectures", Frontiers in Neuroinformatics, vol. 3 (21), Jul. 9, 2009.
Extended European Search Report and Opinion dated Nov. 6, 2013 for corresponding European patent application No. 11783883.9.
Frank et al., "An Accelerator for Neural Networks with pulse-Coded Model Neurons", published 1999.
Kim et al., "Mapping of neural networks onto the memory-processor integrated architecture", published 1998.
Purnaprajna, et al., "Using Run-time Reconfiguration for Energy Savings in Parallel Data Procesing", Proceedings of the International Conference on Engineering of Reconfigurable Systems and Algorithms, Jul. 13, 2009.
Rast, et al., "Virtual Synaptic Interconnect Using an Asynchronous Network-On-Chip", Proceedings of the 2008 IEEE International Joint Conference on Neural Networks, Jun. 1, 2008.
Schaefer et al., "Simulation of spiking neural networks architectures and implementations", published 2002.

* cited by examiner

NEURAL PROCESSING UNIT

CROSS REFERENCE TO RELATED APPLICATION

This application is a continuation of U.S. patent application Ser. No. 13/011,727, entitled "Neural Processing Unit," filed Jan. 21, 2011, which claims the benefit of priority under 35 U.S.C. §119(e) of U.S. Provisional Patent Application No. 61/346,441, entitled "Neural Processing Unit," filed May 19, 2010. The above-identified applications are incorporated herein by reference in their entirety for all purposes.

FIELD

The subject matter described herein relates to data processing and, in particular, neural-based processing.

BACKGROUND

Neural-based data processing may be implemented based on a variety of neural models defining the behavior of neurons, dendrites, and/or axons. In some instances, neural-based data processing may be implemented using an immense numbers of parallel neurons and connections between those neurons. This parallel nature of neural-based processing makes it well suited for processing tasks, such as for example data processing, signal processing, prediction, classification, and the like.

SUMMARY

The subject matter disclosed herein provides methods, apparatus, and articles of manufacture for neural processing.

In one aspect, there is provided a method. The method may include reading, from a first memory, context information stored based on at least one connection value; reading, from a second memory, an activation value matching the at least one connection value; sending, by a first processor, the context information and the activation value to at least one of a plurality of microengines to configure the at least one microengine as a neuron; and generating, at the at least one microengine, a value representative of an output of the neuron.

Embodiments of the method include one or more of the features described herein including one or more of the following features. The reading from the first memory may further include reading a data structure including context information stored in memory serially based on connection values for neurons implemented at the plurality of microengines. The data structure may include a plurality of blocks, each of the plurality of blocks including a type defining execution at the neuron, a first address representative of a location in the first memory where the context information including the at least one connection value is stored, and a second address representative of a location in the second memory where the activation value is stored. The data structure may include a plurality of sequential blocks, each of the plurality of sequential blocks including a connection value and a neuron type defining a corresponding neuron implemented at one of the plurality of microengines. The sequential blocks may be sent to at least one of the plurality of microengines as a packet, and each of the plurality of microengines may include at least one processor and at least one memory. The data structure may include a plurality of sequential blocks, each of the sequential blocks including a neuron type and a plurality of connection values for a corresponding neuron. The first processor may be coupled to the first memory to enable reading from the first memory. The value may be generated at the at least one microengine based on the context information and the activation value without accessing the first memory and the second memory to obtain additional context information. The first memory and the second memory may be implemented in the same memory of an integrated circuit. The generated value may be sent to at least the second memory.

Articles are also described that comprise a tangibly embodied machine-readable medium operable to cause one or more machines (e.g., computers, etc.) to result in operations described herein. Similarly, systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels may refer to the same or similar elements.

DETAILED DESCRIPTION

The subject matter described herein relates to a neural processing unit (NPU) configured by at least one packet including context information. As used herein, context information refers to information for configuring a processor as a neural processing unit. Moreover, some, if not all, of the context information may be stored sequentially, based on connection values, in memory to facilitate processing by the neural processing unit.

Before explaining the details of the neural processing unit, the following provides a description of the processing performed by a neuron implemented using the neural processing unit.

Figure 1:
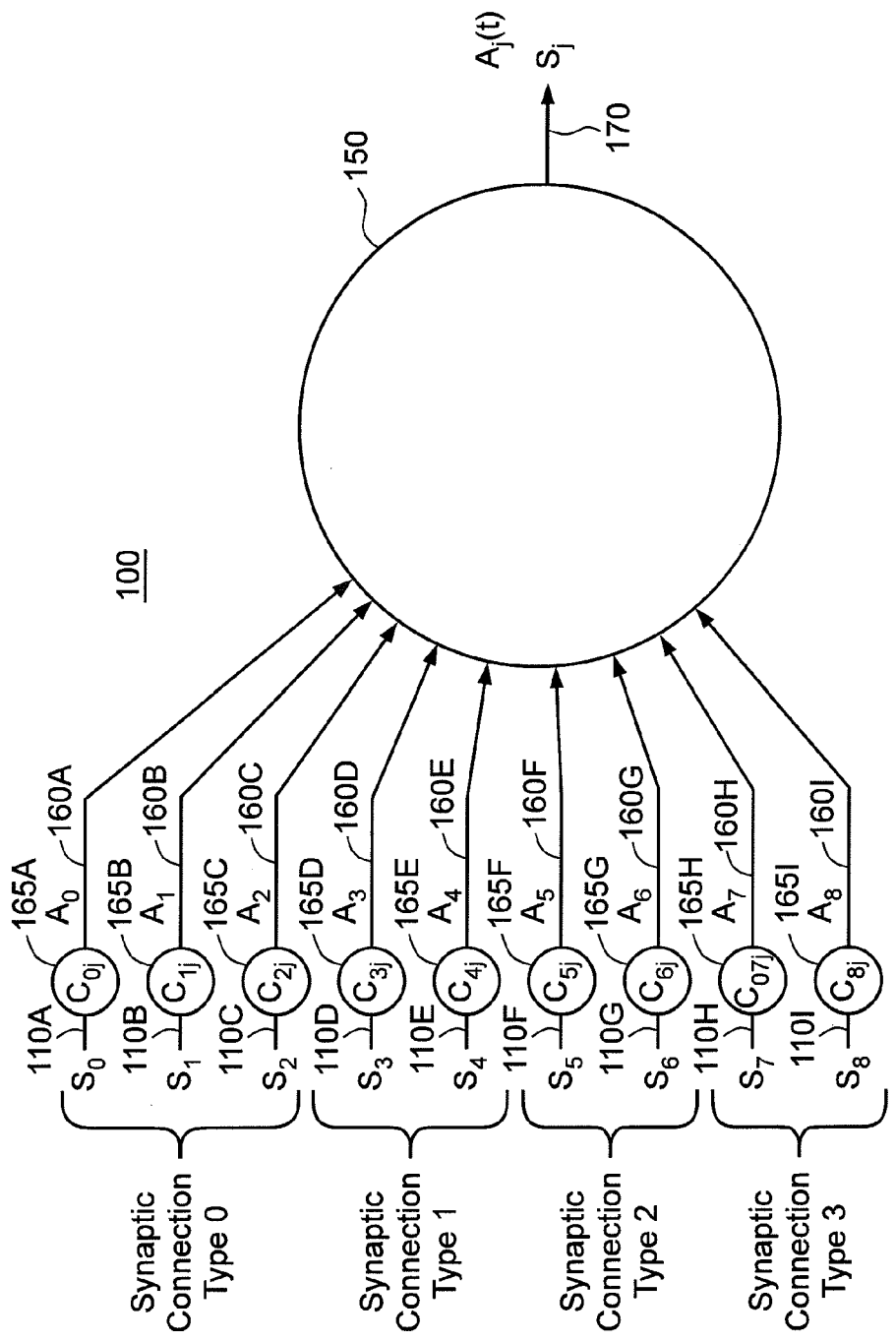
FIG. 1 depicts a block diagram of a neuron.

FIG. 1 depicts a system 100 including a neuron Aj 150 which may be implemented by a neural processing unit. Although FIG. 1 depicts a single neuron 150, system 100 may include a plurality of neurons as well.

The neuron 150 may generate an output Aj(t) 170 based on activation values Ai(t−1) (which correspond to $A_0$-$A_8$) 160A-I, connections Wij 165A-I (which are labeled $c_{oj}$ through $c_{8j}$), and input values 110A-I (labeled $S_0$-$S_8$). The input values 110A-I may be received from the outputs of other neurons, from memory, and/or from one or more sensors providing a value, such as for example a voltage value. The activation values Ai(t−1) may be received from memory and may correspond to an output, such as for example a previous activation value of a previous cycle or epoch (e.g., at t−1) of system 100, although the activation value(s) may be provided by a host computer as well. The connections Wij 165A-I (also referred to as weights, connection weights, and connection values) may be received from memory and/or provided by a host computer.

To illustrate by way of an example, at a given time, t, each one of the activation values 160A-I is multiplied by one of the corresponding connections 165A-I. For example, connection weight $c_{oj}$ 165A is multiplied by activation value $A_0$ 160A, connection weight $c_{1j}$ 165B is multiplied by activation value $A_1$ 160B, and so forth. The products (i.e., of the multiplications of the connections and activation values) are then summed, and the resulting sum is operated on by a basis function K to yield at time t the output $A_j(t)$ 170 for node $A_j$ 150. The outputs 170 may be used as an activation value at a subsequent time (e.g., at t+1).

System 100 may include a plurality of neurons, such as for example neuron 150, and each of the neurons may be implemented on the neural processing units described herein. Moreover, the neurons may be configured in accordance with a neural model, an example of which is as follows:

$$A_j(t) = K\left[\sum_{i=0}^{n} A_i(t-1) * W_{ij}\right],\quad \text{Equation 1}$$

wherein

K corresponds to a basis function (examples of which include a sigmoid, a wavelet, and any other basis function), Aj(t) corresponds to an output value provided by a given neuron (e.g., the $j^{th}$ neuron) at a given time t, Ai(t−1) corresponds to a prior output value (or activation value) assigned to a connection i for the $j^{th}$ neuron at a previous time t−1, Wij represents the $i^{th}$ connection value for the $j^{th}$ neuron, j varies in accordance with the quantity of neurons and identifies a given neuron, i varies from 0 to n−1, and n corresponds to the number of connections to the neuron.

Although the description herein refers to Equation 1 as an example of a neural model, other models may be used as well to define the type of neuron. Moreover, in some implementations, each connection may be associated with one of a plurality of neuron types. For example, connections Wij 165A-C may implement a first neural model corresponding to a first type of neuron, and connections Wij 165D-E may implement a second neural model corresponding to a second type of neuron. In this example, the context information would include the connection values and information representative of the types of neurons.

Figure 2:
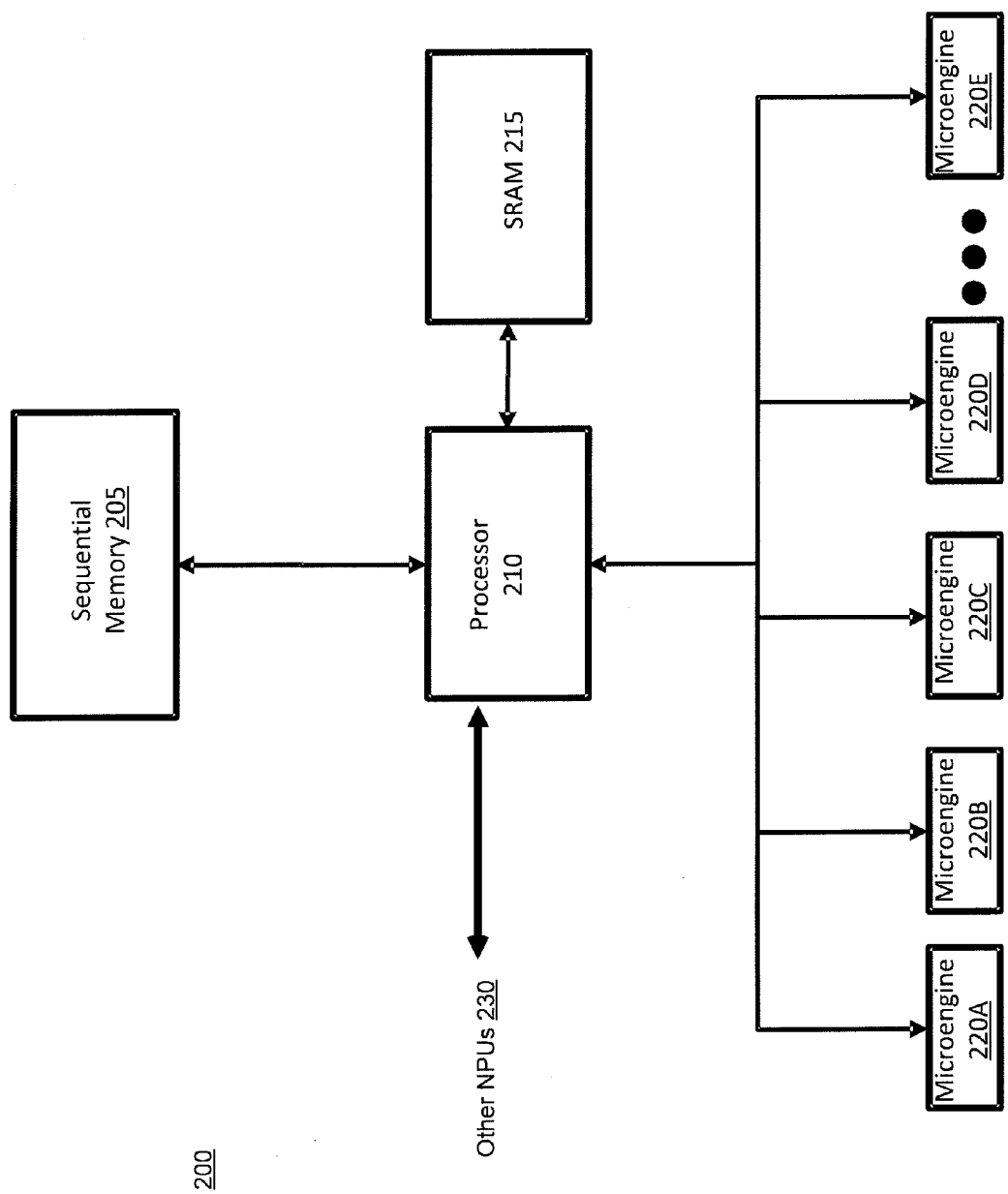
FIG. 2 depicts a block diagram of a neural processing unit (NPU)

FIG. 2 depicts an example implementation of a neural processing unit 200 configured to operate as a neuron, such as for example neuron 150 described above with respect to FIG. 1. The neural processing unit 200 includes a first memory, such as for example sequential memory 205, a processor 210, a second memory, such as for example static random access memory 215 (labeled SRAM), and one or more processors, such as for example one or more microengines 220A-E configured to implement neurons.

Although FIG. 2 depicts a single neural processing unit 200, in some implementations, a system may include a plurality of neural processing units. For example, a plurality of neural processing units may be implemented on an integrated circuit and/or application specific integrated circuit to provide a neural processing system.

The sequential memory 205 may be implemented as any type of memory, such as for example random access memory, dynamic random access memory, double data rate synchronous dynamic access memory, flash memory, ferroelectric random access memory, mechanical, magnetic disk drives, optical drives, and the like. Sequential memory 205 may include context information comprising some, if not all, of the information required to configure a microengine, such as for example microengine 220A, as a neuron. For example, the sequential memory 205 may include a data structure including one or more of the following: the identity of the neuron (e.g., which one of the j neurons is being configured); the connection values Wij for each connection i, an indication of the basis function K being used, and/or previous activation values Ai(t−1).

In some implementations, the context information is obtained from sequential memory 205 in a packet format. The term packet refers to a container including the context information and/or a pointer to the context information. The packets provide the connection values and other information (e.g., instructions to configure a type of neuron, an indication of the basis function K, the identity of the $j^{th}$ neuron, etc.) but the previous activation values Ai(t−1) are obtained from another memory, such as for example static random access memory 215. The packets read from sequential memory 205 may include context information configured as the data structure described below with respect to FIGS. 3A-B. In some implementations, sequential memory 205 may also receive context information from a host computer.

The processor 210 may be implemented as any type of processor, such as for example, a central processing unit configured to handle a very long instruction word (VLIW), although other type of processors may be used as well. The processor 210 may retrieve context information (formatted as one or more packets) from sequential memory 205.

One or more additional neural processing units (also referred to as clusters) may receive context information from processor 210 and/or provide context information to processor 210 via connection 230. The processor 210 may also store and/or retrieve intermediate values, such as for example previous activation values Ai(t−1) from static random access memory 215.

The processor 210 may route packets including the context information obtained from memory 205 and any intermediate values (e.g., previous activation values Ai(t−1) obtained from static random access memory 215) to a microengine to configure the microengine as a neuron.

In some implementations, context information in memory 205 is organized in sequential blocks, as described further below with respect to FIGS. 3A-B. The context information in memory 205 is read from the sequential blocks in memory 205 to configure the microengines as neurons. Moreover, if the system includes a plurality of neurons, the processor 210 may route a set of packets including context information to each of the microengines 220A-E to configure each of the microengines as a neuron operating in accordance with a model, such as for example the neural model of Equation 1 above. In addition, the configuration and execution of the microengines may be repeated over time for each of the connections, neurons, and/or epochs.

Each of the microengines 220A-E may be implemented as a processor, such as for example a central processing unit, a reduced instruction set processor, and the like. In implementations using the reduced instruction set processor, the functionality of the reduced instruction set processor may be limited, reducing thus the space/size used on a chip, such as for example an integrated circuit. In any case, the microengines 220A-E may each be configured by context information provided by processor 210 to enable a neuron to be implemented at a microengine.

Figure 3A:
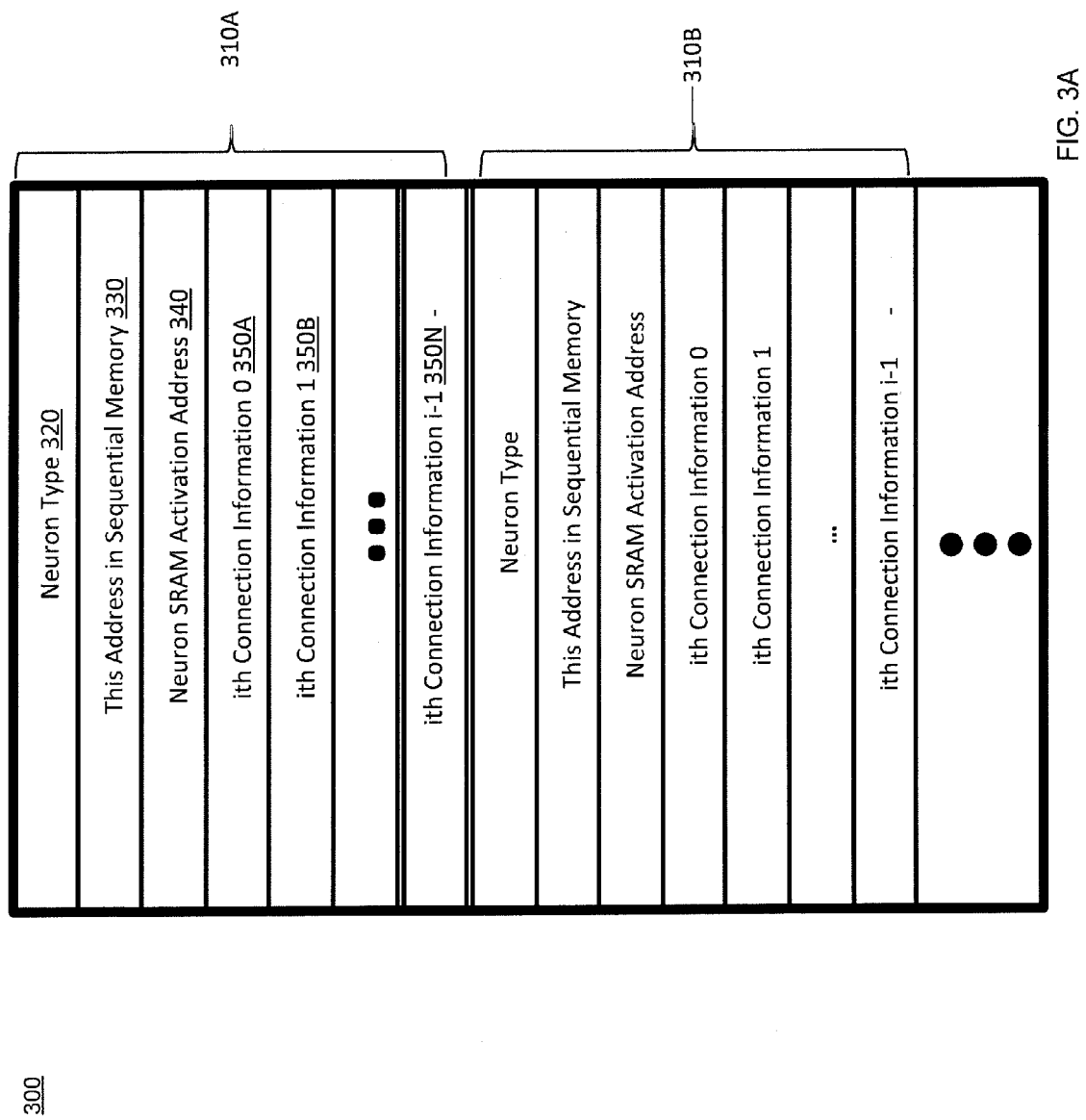
FIGS. 3A-B depict examples of data structures for sequentially storing context information.

FIG. 3A depicts an example of a data structure 300 stored in sequential memory, such as for example sequential memory 205. In the example of FIG. 3A, the sequential memory is configured to store blocks 310A-B of context information which can be read from, and/or written to, sequentially until the end of data structure 300, and then reading and/or writing would resume at the beginning of memory, such as for example block 310A. The blocks 310A-B correspond to each of the plurality of neurons of the neural processing system.

For example, for a given neuron, such as the $j^{th}$ neuron, a block 310A may store context information. Specifically, the block 310A may include information defining the type of neuron 320. The type 320 defines the kind of neuron and how to execute the neuron. For example, the type 320 may define the neural model, defining Equation 1 or the basis function K being used by the $j^{th}$ neuron. In this example, a neuron type may have a corresponding code set which is loaded into a microengine to enable the microengine to process the context information and generate an output. Moreover, in some implementations, a plurality of neuron types are supported, such that the system configures a microengine with a corresponding code set for the type of neuron indicated in the context information.

The context information in block 310A may also include the address 330 being used in sequential memory to store block 310A. The address 330 enables write backs to sequential memory if the contents of block 310A are changed, such as for example by altering weights for learning and plasticity. The context information in block 310A may also include the activation address 340 associated with a given connection of the neuron of block 310A. The activation address 340 may, for example, enable loading from static random access memory 215 activation values for connections being used in block 310A. The block 310A may also include the connection values being used 350A-N. For example, for a given neuron j having 10 connections, the block 310A would include 10 connection values corresponding to $W_{0j}$ to $W_{9j}$.

The data structure 300 may include other blocks, such a block 310B and the like, for each of the neurons being implemented by the neural processing system. The use of data structure 300 may allow sequential reading of context information (which is formatted in a packet-based format) for each neuron, and then configuring and executing those neurons at microengines. In some implementations, the data structure 300 may reduce, if not eliminate, inefficient, random, memory reads by the microengine to memories 205 and 215 during microengine execution of neurons.

Figure 3B:
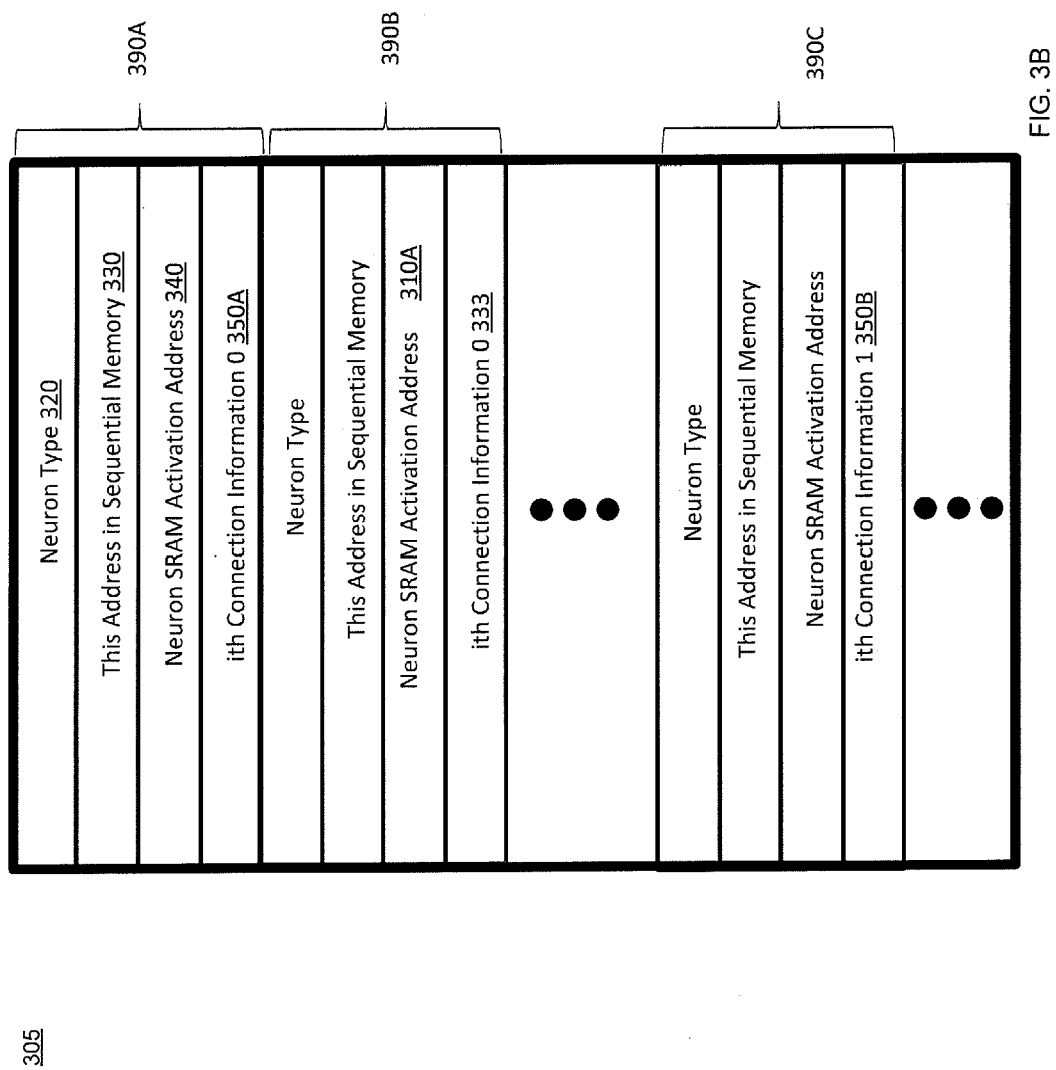

FIG. 3B depicts another example of a data structure 305 stored in sequential memory. In the example of FIG. 3B, each block 390A-C may include a single connection value for a neuron. Specifically, block 390A includes the first connection 350A and other context information 320-340 for configuring a first neuron, block 390B includes a first connection value 333 and other context information for configuring a second neuron, and so forth until all of the first connection values of a set of neurons have configured for execution. Once executed, the output activation values may be stored in for example static random access memory 215, and then the next set of connections for the neurons is processed. Block 390C includes the second connection 350B and other context information for configuring the first neuron. Once configured with the second connection values, the second set of connections for the neurons is processed, yielding another set of output activation values. This process may be repeated for each of the connections to the neurons until all of the connections are processed, at which time the process repeats starting at the first connection at block 390A of data structure 305.

In some implementations, the data structures 300 and 305 may reduce the quantity of memory accesses when a processor executes a neural model and retrieves data required to execute that model. For example, in a typical microprocessor not configured in accordance with the data structures described herein, the microprocessor would require extensive random fetches of data from memory in order to execute the neural model of Equation 1 due to for example the indexing from 0 to n, 1 to i, and 1 to j. In contrast, the microengines described herein may, in some implementations, reduce, if not eliminate, the random fetches from memory by serially, sequencing the context information in memory as depicted in the example data structures 300 and 305. Moreover, the random fetches of system 200 may, in some implementations, be limited to processor 205 retrieving activation values from static random access memory 215. In some implementations, a first processor, such as for example processor 210 handles all of the memory fetches from memory 205 and 215 which are associated with the indexing noted above, and second processors, such as for example the microengines, implement the neurons without accessing memory 205 and 215. Moreover, the microengines may be configured to operate the neurons using data accessed from its register memory (which is described further below with respect to FIG. 5). In addition, the system including the first and second processors may, in some implementation, facilitate efficient processing, especially in the context of the sparse matrixes associated with, for example, neural models, such as for example Equation 1.

Figure 4:
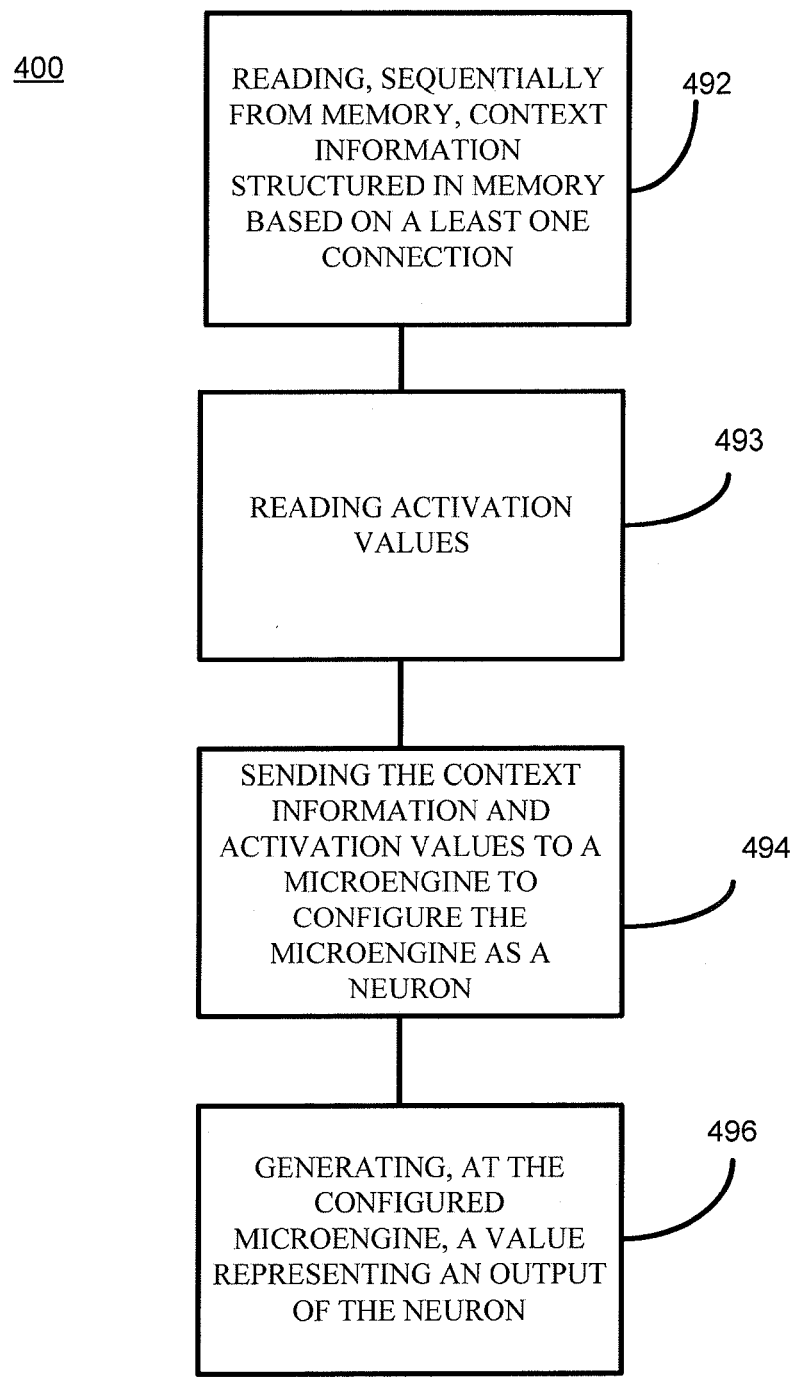
FIG. 4 depicts a process for configuring a neuron based on the context information.

FIG. 4 depicts a process 400, which may be implemented by the neural processing systems described herein. The description of FIG. 4 also refers to FIG. 2 and FIGS. 3A-B.

At 492, processor 210 may sequentially from memory 205. This sequential reading may include reading from a block of consecutive addresses in memory 205 at least one of a plurality of packets including context information. For example, the data may be read sequentially in blocks as described with respect to FIGS. 3A-B. The context information may include information for configuring a microengine as a neuron in accordance with a neural model, such as for example Equation 1. For example, the packets received from sequential memory 205 may provide the connection values and other information (e.g., instructions indicating neuron type, activation values, etc.) to configure a neuron.

At 493, processor 210 may also read from static random access memory 215 the previous activation values Ai(t−1). Referring to FIGS. 3A-B, the processor 210 may receive a packet including a connection value 350A, a neuron type 320, an address 330 in sequential memory, and an address 340 in static random access memory 215. The processor 210 may then use the address 340 to locate static random access memory 215, and then use a lookup table to determine an activation value that corresponds to the connection value 350A.

At 494, the processor 210 may forward the context information and the activation value to a microengine to configure the microengine. For example, the processor 210 may forward to microengine 220A at least one packet including the context information (e.g., connection value 350A, a neuron type 320, and the like) and the activation value obtained from static random access memory 215. When the microengine receives the at least one packet, the microengine 220A may configure itself based on the neuron type (e.g., by loading a code set/instructions for the neuron type indicated by neuron type 320) and then execute the neuron using the connection value 350A, activation value, and other context information which may be provided to the microengine.

At 496, the configured at least one microengine generates for a given time t an output, such as for example Aj(t). The output Aj(t) may also be provided to processor 210, which may route the output Aj(t) to static random access memory 215 or other neural processing units 230. The process 290 may be repeated for each of the connections, neurons, and/or epochs of a system.

Figure 5:
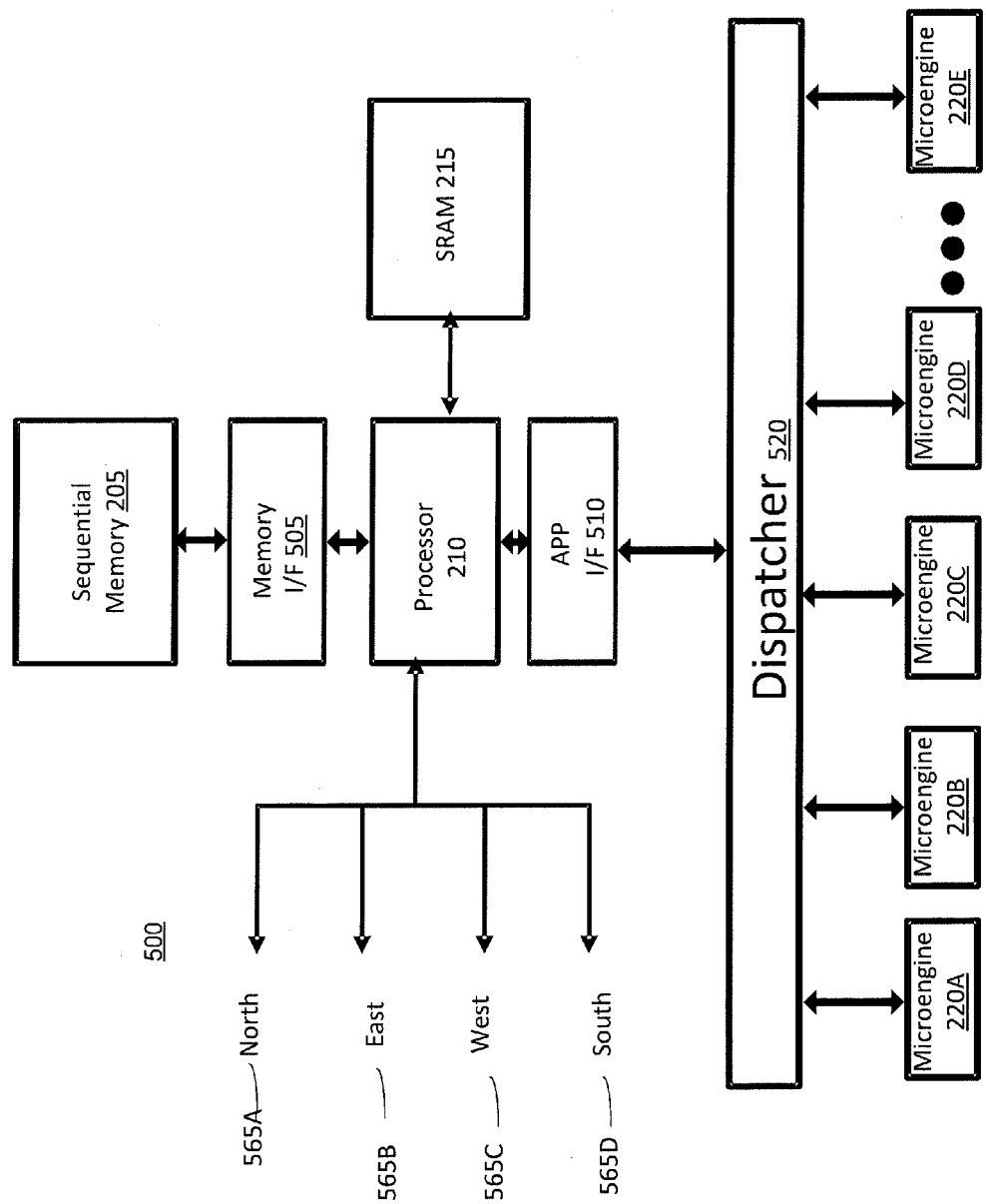
FIG. 5 depicts another block diagram of a neural processing unit.

FIG. 5 depicts another example implementation of a neural processing unit 500. Neural processing unit 500 is similar to system 200 in some respects but further includes a memory interface 505, an application interface 510, and a dispatcher 520. The memory interface 505 is coupled to sequential memory 205 and processor 210, and the application interface 510 is coupled to processor 210 and dispatcher 520, which is further coupled to microengines 220A-E.

The memory interface 505 controls access to sequential memory 205. For example, the memory interface 505 may sequentially index into memory 205 to retrieve the next packet of context information which is passed to the processor 210.

The processor 210 may be further configured as a router. When the processor 210 receives context information in packet form from sequential memory 205 and/or memory 215, the processor 210 may then route the packet-based context information to a microengine to configure the microengine as a neuron. After the neuron is executed, the packet processor 210 may also receive an output value Aj(t) generated by a microengine. The received output value Aj(t) may then be provided to other neural processing units via connections 565A-D and/or stored in memory, such as for example static random access memory 215.

During an initial load of data from a host computer to configure system 500, the processor 210 may move blocks of data from the host computer to, for example, sequential locations in sequential memory 205 and other locations, such as for example static random access memory 215, other adjacent neural processing units via connections 565A-D, and/or one or more of the microengines 220A-E.

During execution of a neuron at a microengine, the processor 210 may match a connection weight to an activation value. For example, the processor 210 may receive from sequential memory 205 a packet including a connection weight Wij for the $i^{th}$ connection of the $j^{th}$ neuron. For the $i^{th}$ connection, the processor 210 may then match the connection weight Wij to the previous activation value Ai(t−1), which is stored in static random access memory 215. In some implementations, a lookup table is used to match each of the connection weights Wij to corresponding activation values Ai(t−1) stored in static random access memory 215.

The application interface 510 provides an interface to each of the microengines 220A-E. In some implementations, the application interface 510 may fetch from static random access memory 215 an activation value that matches a connection value included in a received packet. The address of the matching activation value may be included in a packet received from processor 210. For example, the address of the matching activation address may be stored in the packet as a neuron static random access memory activation address 340. The packet including context information (e.g., neuron type, connection value, activation value, and the like) is then forwarded to a microengine.

The dispatcher 520 provides packet handling and queuing for packets exchanged among the application interface 510 and the microengines 220A-E. In some implementations, the dispatcher 520 selects a destination microengine for a packet including context information. The dispatcher 520 may also load the microengine including the registers of the microengine with context information and may send output data from the microengines 220A-E to other neural processing units, static random access memory 215, and/or sequential memory 205.

The neural processing unit 500 may be connected to other neural processing units via connections 565A-D (labeled North, East, West, and South). For example, neural processing unit 500 may have connections 565A-D to four other neural processing units, such as for example a neural processing unit north of unit 500, a neural processing unit south of unit 500, a neural processing unit east of unit 500, and a neural processing unit west of unit 500). Moreover, each of the other neural processing units may be coupled to four other neural processing units, and, in some implementations, each of the neural processing units may be implemented on one or more application specific integrated circuits.

Figure 6:
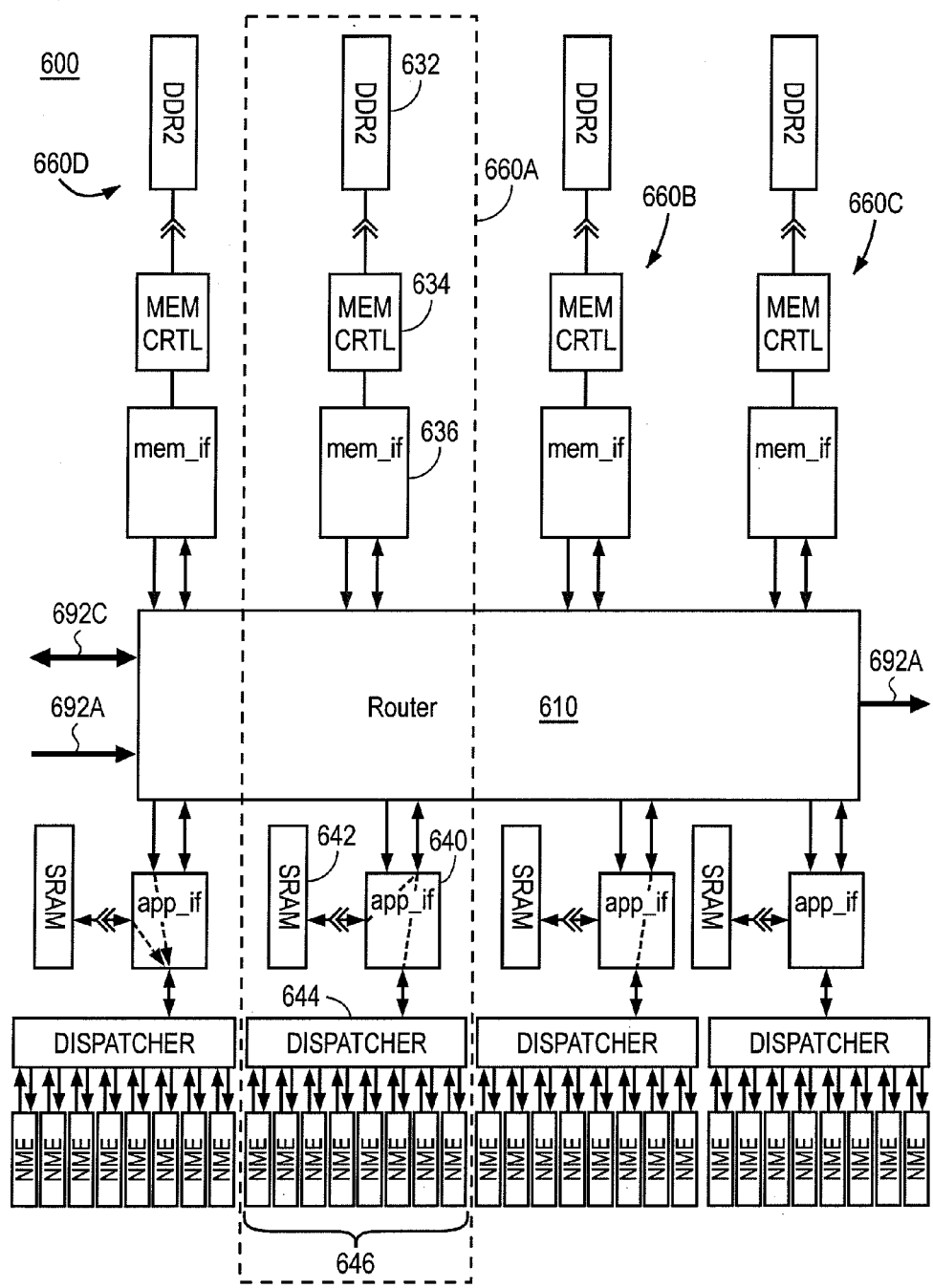
FIG. 6 depicts a block diagram of a system including a plurality of neural processing units.

FIG. 6 depicts an example of a system 600 including four neural processing units 660A-D. Each of the neural processing units may include sequential memory 632 (labeled DDR2), a memory controller 634, a memory interface 636, an application interface 640, a static random access memory 642, a dispatcher 644, and a plurality of microengines 646 (labeled NME).

In the implementation depicted at FIG. 6, each of the neural processing units 660A-D are coupled to router 610, which may be implemented as described above with respect to processor 210. However, router 610 may, in some implementations, be further configured as a non-blocking, cross-bar packet router providing multiple, parallel paths among inputs and outputs, such as for example memory interfaces and application interfaces.

The following provides a description of the elements within neural processing unit 660A, but the other neural processing units 660B-D may be configured in a manner similar to neural processing unit 660A. Moreover, system 600 including neural processing units 660A-D may be implemented on a chip, such as for example an application specific integrated circuit (ASIC), and, although only four neural processing units 660A-D are depicted at FIG. 6, system 600 may include other quantities of neural processing units as well.

The sequential memory 632 may be implemented as described above with respect to sequential memory 205. In the example of FIG. 6, the sequential memory 632 may be implemented as double data rate synchronous dynamic access memory, although other types of memory may be used as well. The sequential memory 632 may be electrically coupled to memory controller 634 to allow reads from, and writes to, sequential memory 632.

The memory controller 634 may control reading and writing to sequential memory 632. The context information may be stored in sequential addresses of sequential memory 632, and the context information may be read from, or written to, memory 632 in a packet-based format. When a packet-based format is implemented, the packets may be provided to, or received from, the router 610 via an electrical connection to the memory interface 636. Moreover, the memory controller 634 may, in some implementations, provide an interface that generates packets from data obtained from memory, such as for example memory 632 and sends the generated packets to the router 610. The memory controller 634 may also accept packets from the router 610 and write the contents of packets to the memory 632. Different types of memory, ranging from static random access memory, dynamic random access memory to, more persistent, optical storage mechanisms may be used at memory 632 but regardless of the type of memory being used, the memory controller 634 handles packet and addresses packets to memory.

The memory interface 636 may be implemented in a manner similar to memory interface 505 described above. In the example of FIG. 6, the memory interface 636 may buffer packets sent to, or received from, the memory controller 634.

The router 610 may be electrically coupled to each of the application interfaces at 660A-D and to connections 692A-C. Connections 692A-C may provide connections to other devices, such as for example other neural processing units, memory, host computers, and the like. In some implementations, the connection 692C may be implemented as a PCI interface to allow transferring data to (and from) the router 610 at speeds of up to 132 megabits per second. The connection 692C may also handle loading, debugging, and processing data for the system 600. For example, connections 692A-C may be used to couple system 600 to a host computer. The host computer may provide context information including activation values, receive output values generated by the microengines, and provide code to each of the microengines to configure a microengine as a neuron.

The application interface 640 may be implemented in a manner similar to application interface 510. In the example at FIG. 6, the application interface 640 may, however, be electrically coupled to static random access memory 642 and dispatcher 644. The static random access memory 642 may be implemented in a manner similar to static random access memory 215, and the dispatcher 644 may be implemented in a manner similar to dispatched 520. The dispatcher 644 is electrically coupled to a plurality of microengines 646 (labeled NME), which may be implemented in a manner similar to microengines 210A-E.

Figure 7:
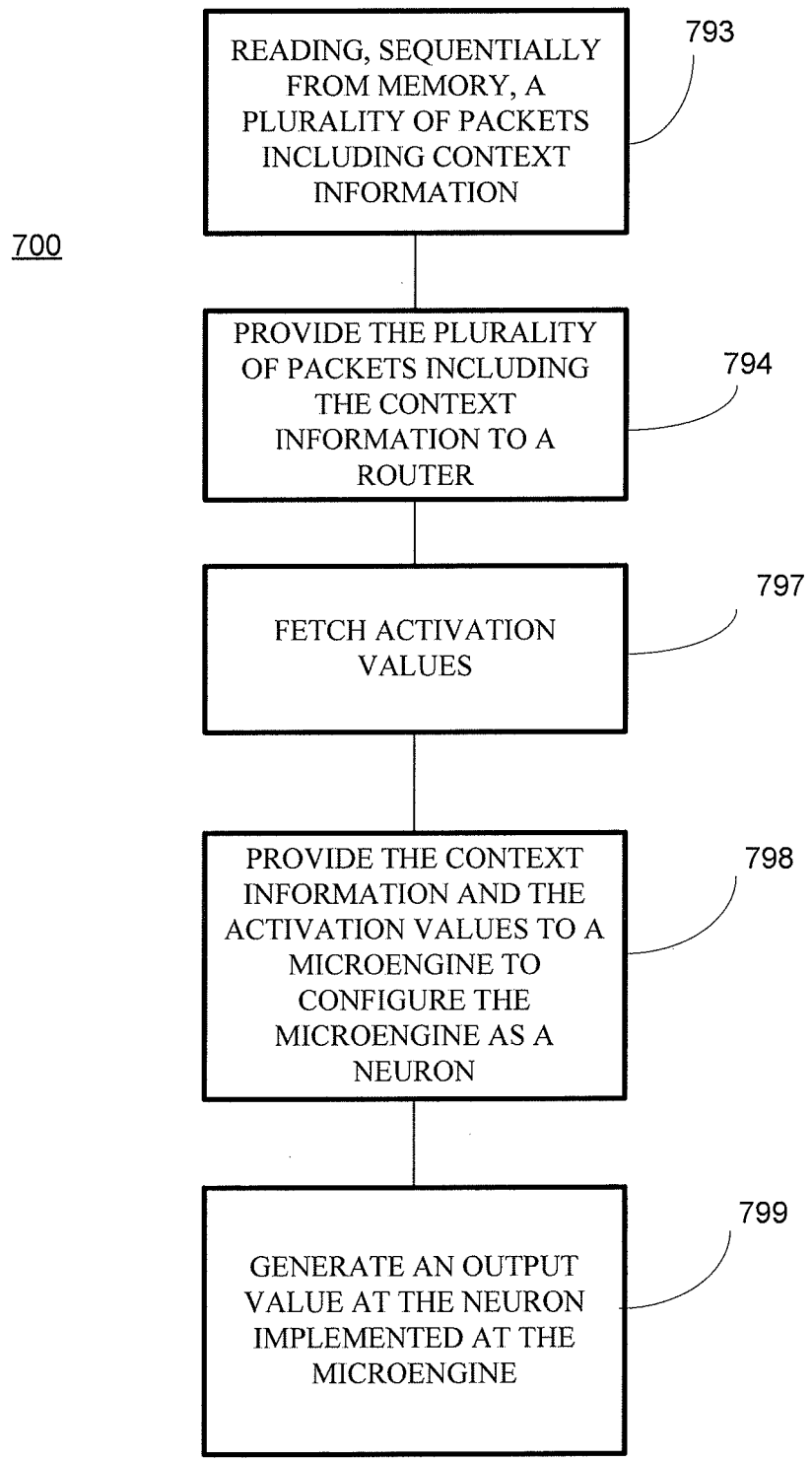
FIG. 7 depicts another process for configuring a neuron.

FIG. 7 depicts a process 700, which may be implemented by a neural processing systems described herein. The description of process 700 will also refer to FIGS. 3A-B and 6.

At 793, memory controller 634 may read data from sequential addresses of memory 632. This reading operation may include reading at least one of a plurality of packets including context information for configuring a microengine as a neuron in accordance with a neural model. The memory controller 634 may provide the read packet(s) to memory interface 636, where the packet(s) may be queued before being provided to router 610. The memory controller 634 may also control writing data, such as for example packets received from router 610, to memory 632.

At 794, the router 610 may receive from memory interface 636 at least one of the plurality of packets and then provide the received packets to one of the application interfaces at 660A-D. For example, the router 610 may route the at least one packet including a connection weight Wij for the $i^{th}$ connection of the $j^{th}$ neuron to application interface 640.

At 797, the application interface may fetch the matching activation value from memory. For example, the application interface 640 may match the connection weight to the previous activation value Ai(t−1) and then fetch the matching activation value from memory, such as for example static random access memory 642. For each packet received, the application interface 640 may read the connection weight Wij included in the packet and then determine a matching activation value stored in static random access memory 642. As noted, application interface 640 may determine a match based on a lookup table indicting which activation value to fetch.

At 798, the application interface, such as for example application interface 640, may then provide the context information (e.g., connection weight Wij, the matching activation value Ai(t−1, and the like) to a dispatcher, such as for example dispatcher 644. Next, the dispatcher 644 provides this context information to one of the microengines 646 to configure the microengine as a neuron.

At 799, the configured microengine generates an output, such as for example Aj(t). The output Aj(t) may be provided to dispatcher 644 and application interface 640, which may provide the output Aj(t) to static random access memory 642 or other neural processing units 660B-D. The process 700 may be repeated for each of the connections of a neuron and repeated for each neuron of a neural processing system. Moreover, process 700 may be repeated for a plurality of epochs.

Figure 8:
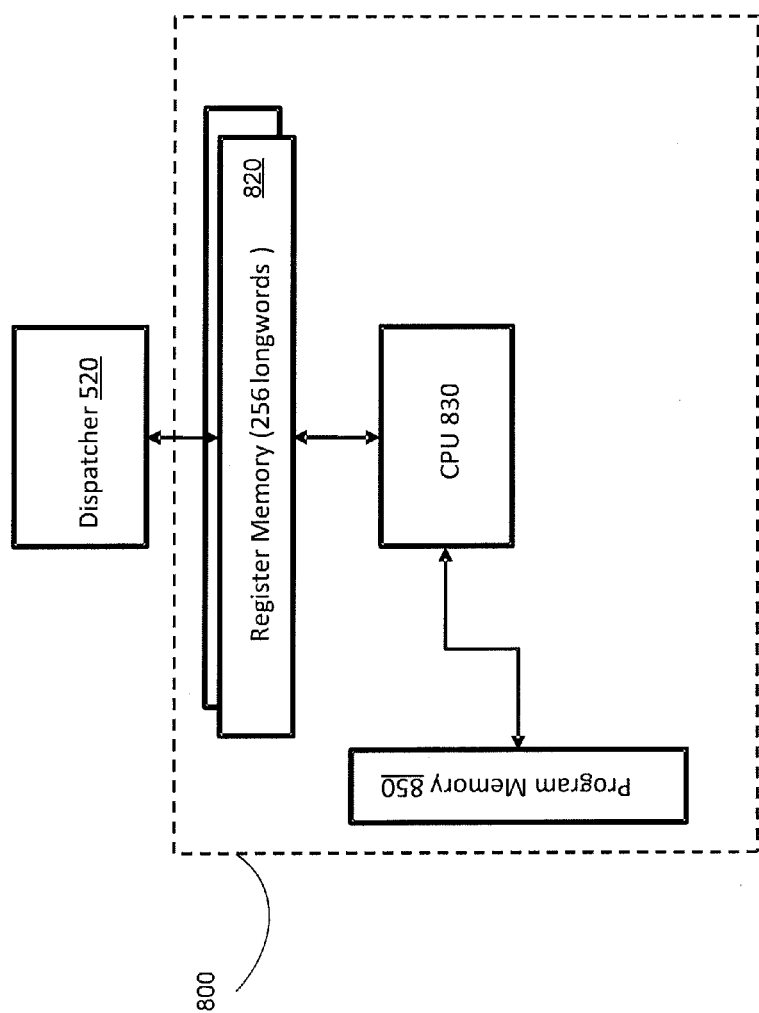
FIG. 8 depicts an example of a microengine configured to implement a neuron based on context information.

FIG. 8 depicts an example of a microengine 800, which may be used at microengines 220A-E and/or microengines 646. The microengine 800 may include a register memory 820, a central processing unit 830, and program memory 850. The microengine 800 may be electrically coupled to dispatcher 520 to allow microengine 800 to receive packets including context information, activation values, and the like from dispatcher 520 and to provide output activations to dispatcher 520.

In some implementations, the microengine 800 receives a packet including context information, such as for example block 390A depicted at FIG. 3B. The microengine 800 stores block 390A in register 820. The microengine 800 may then access program memory 850 to obtain instructions, such as for example program code, to configure the microengine in accordance with the neural type 320 indicated by the context information of block 390A stored in register 820. Next, the microengine 800 executes the instructions using the context information (e.g., activation value and connection value) included in the block stored at register 820. The output is then sent to dispatcher 520, where it is further routed to another device, such as for example static random access memory, another neural processing unit, and/or a host computer. The output may be used as an activation for a subsequent time.

The register 820 may receive from the dispatcher 520 context information structured for example as described above with respect to FIGS. 3A-B. The register 820 may also include a control status register (CSR), an accumulating register, a program counter (PC), and a number of scratch-pad registers. The register 820 may be implemented to include sufficient storage space to store at least data structures 300 and 305 and/or at least one of the blocks of the data structures 300 and 305 depicted at FIGS. 3A-B. The register 820 may also be implemented in a ping-pong configuration including two identical register banks to allow the dispatcher

520 to write into one of the banks of register 820 while the central processing unit 830 reads and executes from the other banks of register 820.

The microengine 800 may include a set of instructions (e.g., code) defining a set of possible neural models that can be implemented at the microengine. Thus, the set of instructions (which may be stored in program memory 850) may be used to configure and code the microengines to operate as at least one of a plurality of neuron types. Moreover, the set of instructions may be ported among microengines to facilitate configuration. The code for microengine 800 may also use an assembler to handle an assembly language program and turn that program into a binary code file for loading into the microengine. For example, a neural assembler may be invoked via a command line to take an assembly code program and turn the assembly code into a binary file for loading into the microengine.

Figure 9:
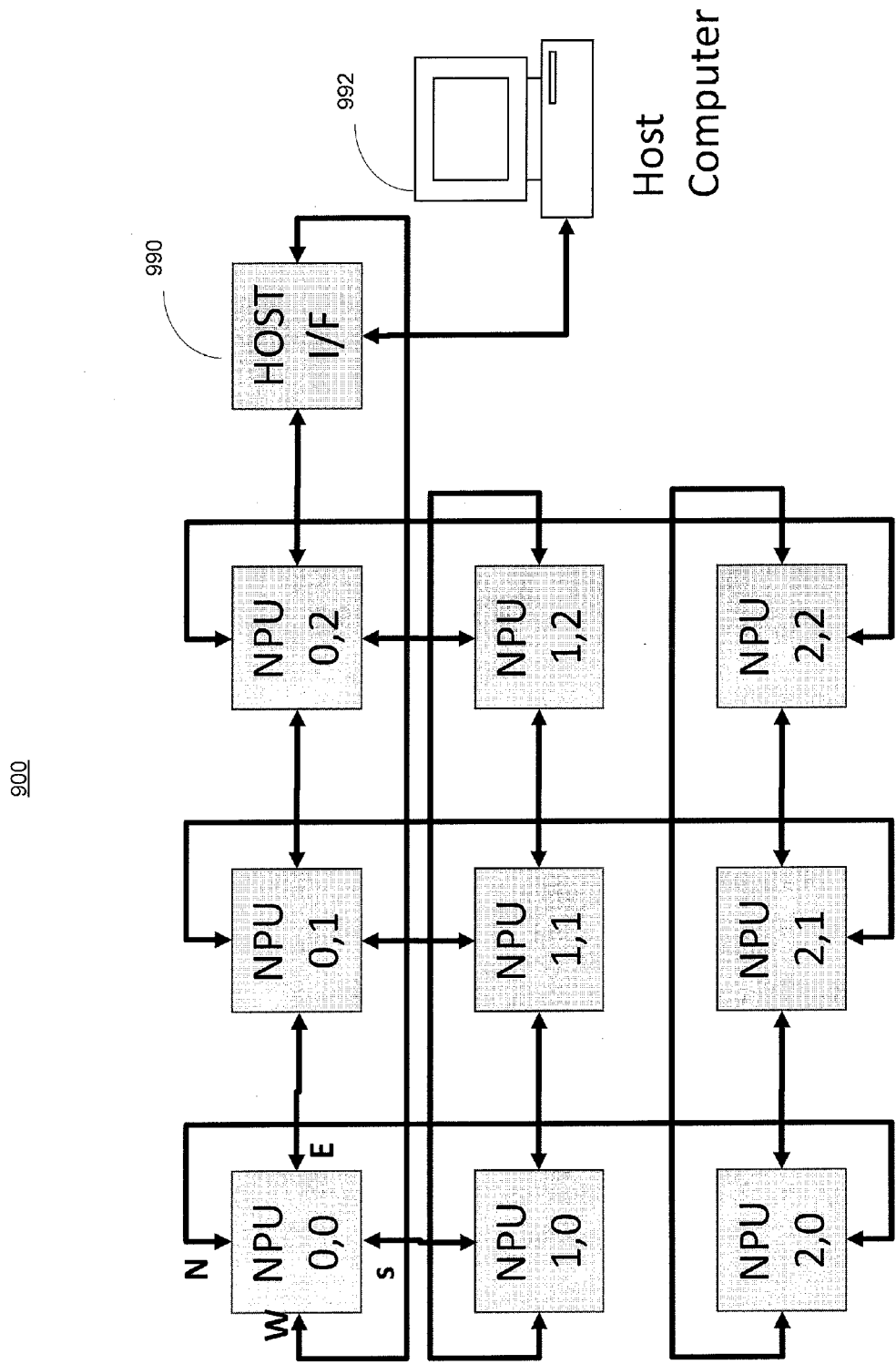
FIG. 9 depicts a block diagram of a system including a plurality of neural processing units.

FIG. 9 depicts a system 900, referred to herein as a hive. The neural processing units (each labeled as NPU) may be interconnected in a two-dimensional grid layout. In some implementations, the two-dimensional grid structure may increase processing power, when compared to multiple processors sharing a single memory bus. The interconnections among neural processing units may be implemented as electrical interconnections providing high-speed, serial data lines. The host interface 990 may interface the neural processing units and a host computer 992. For example, the host interface 990 may pass packets into the hive, read packets exchanged among the neural processing units, and intercept packets sent among neural processing units. The neural processing units may each have a unique identifier to enable locating and/or addressing each neural processing unit.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

Similarly, systems are also described herein that may include a processor and a memory coupled to the processor. The memory may include one or more programs that cause the processor to perform one or more of the operations described herein.

Moreover, although the systems herein are described within the context of neural processing, the systems described herein may be used in other environments including, for example, finite element analysis and filter bank processing. Furthermore, the term set may refer to any quantity including the empty set.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A computer-implemented method, the method being implemented by an integrated circuit on a chip, the integrated circuit including a first processor and a plurality of microengines that include a first microengine, the method comprising:
    storing, in a first memory, a first block that corresponds to a first neuron and a second block that corresponds to a second neuron, wherein the first block and the second block are stored sequentially in the first memory;
    obtaining, from the first memory, the first block that corresponds to the first neuron, wherein the first block includes connection information for the first neuron and an address representative of a location in a second memory, and wherein activation values matching the connection information for the first neuron are stored at the location in the second memory;
    obtaining, from the second memory, the activation values matching the connection information for the first neuron;
    sending, by the first processor, a packet that includes the connection information and the activation values, wherein the packet is sent to the first microengine to configure the first microengine as the first neuron; and
    generating, at the first microengine, a value representative of an output of the first neuron.

2. The method of claim 1, wherein context information for configuring the first microengine as the first neuron is stored at the first block, and wherein the context information includes the connection information and one or more of an identity of the first neuron and a basis function.

3. The method of claim 2, wherein the packet includes at least a portion of the context information for configuring the first microengine as the first neuron.

4. The method of claim 1, wherein the obtaining the activation values is based on at least the second address.

5. A computer-implemented method, the method being implemented by an integrated circuit on a chip, the integrated circuit including a first processor and a plurality of microengines that include a first microengine, the method comprising:
    storing, in a first memory, context information corresponding to a first neuron and context information corresponding to a second neuron, wherein the context information corresponding to the first neuron and context information corresponding to the second neuron are stored sequentially in the first memory;
    obtaining, from the first memory, the context information corresponding to the first neuron, wherein the context information corresponding to the first neuron includes a neuron type for the first neuron and connection information for the first neuron, wherein connection information indicates connections between the first neuron and one or more other neurons;

obtaining, from a second memory, activation values corresponding to the connections between the first neuron and the one or more other neurons;

sending, by the first processor, a packet that includes the context information and the activation values, wherein the packet is sent to the first microengine to configure the first microengine as a first neuron;

configuring, based at least on the context information and the activation values, the first microengine as the first neuron; and generating, at the first microengine, a value representative of an output of the first neuron.

6. The method of claim 5, wherein the context information further includes an identity of the first neuron.

7. The method of claim 5, wherein the generating includes executing the first neuron using the activation values.

8. The method of claim 5, further comprising:
receiving, at the first processor, a second packet including the value representative of the output of the first neuron.

9. The method of claim 5, wherein the obtaining of the context information that corresponds to the first neuron is based on at least a first address representative of a first location in the first memory, and wherein the obtaining of the activation values is based on at least a second address representative of a second location in the second memory.

10. The method of claim 5, wherein the first memory and the second memory are implemented in the integrated circuit.

11. A computer-implemented method, the method being implemented by an integrated circuit on a chip, the integrated circuit including a first processor and a plurality of microengines that include a first microengine and a second microengine, the method comprising:
storing, in a first memory, first context information that corresponds to a first neuron and a second context information that corresponds to a second neuron, wherein the first context information and the second context information are stored sequentially in the first memory;
obtaining, from the first memory, the first context information that corresponds to the first neuron, wherein the first context information includes a first neuron type for the first neuron, and first connection information for the first neuron, wherein the second connection information indicates a first set of connections between the first neuron and one or more other neurons;
obtaining, from the first memory, the second context information that corresponds to the second neuron, wherein the second context information includes a second neuron type for the second neuron, and second connection information for the second neuron wherein the second connection information indicates a second set of connections between the second neuron and one or more other neurons, and wherein the second set of connections includes a connection between the second neuron and the first neuron;
obtaining, from a second memory, a first set of activation values that correspond to the first set of connections;
obtaining, from the second memory, a second set of activation values that correspond to the second set of connections;

sending, by the first processor, a first packet that includes the first context information and the first set of activation values wherein the first packet is sent to the first microengine to configure the first microengine as a first neuron;

sending, by the first processor, a second packet that includes the second context information and the second set of activation values, wherein the second packet is sent to the second microengine to configure the second microengine as a second neuron;

configuring, based at least in part on the first context information and the first set of activation values, the first microengine as the first neuron;

configuring, based at least in part on the second context information and the second set of activation values, the second microengine as the second neuron;

generating, at the first microengine, a first value representative of a first output of the first neuron;

effectuating transmission of a third packet from the first microengine to the second microengine, wherein the third packet includes the first value representative of the first output of the first neuron; and generating, at the second microengine, a second value representative of a first output of the second neuron, wherein the generating of the second value is includes using the first value as an activation value that corresponds to the connection between the second neuron and the first neuron.

12. The method of claim 11, further comprising:
generating, by the first processor, the first packet and the second packet.

13. The method of claim 11, wherein the generating of the second value is based on at least the second packet and the third packet, and wherein the second value is generated without accessing the first memory and/or the second memory to obtain additional information.

14. The method of claim 11, wherein the first context information further includes an address representative of a location in the second memory, wherein the first set of activation values is stored at the location in the second memory, and wherein the obtaining of the first set of activation values is based on at least the address.

15. The method of claim 11, wherein the effectuation of the transmission of the third packet includes routing, by the first processor, the third packet from the first microengine to the second microengine.

16. The method of claim 11, wherein the generating of the first value includes executing, by the first microengine, the first neuron in accordance with the at least a portion of the first context information that is included in the first packet.

17. An apparatus, comprising:
at least one processor; and
at least one non-transitory computer readable medium including computer program code which when executed by the at least one processor causes the apparatus to at least:
store, in a first memory, a first block that corresponds to a first neuron and a second block that corresponds to a second neuron, wherein the first block and the second block are stored sequentially in the first memory;
obtain, from the first memory, the first block that corresponds to the first neuron, wherein the first block includes connection information for the first neuron and an address representative of a location in a second memory, and wherein activation values matching the connection information for the first neuron are stored at the location in the second memory;

obtain, from the second memory, the activation values matching the connection information for the first neuron;

send, by the first processor, a packet that includes the connection information and the activation values, wherein the packet is sent to the first microengine to configure the first microengine as the first neuron; and generate, at the first microengine, a value representative of an output of the first neuron.

* * * * *